United States Patent [19]

Brumbelow

[11] 3,995,373
[45] Dec. 7, 1976

[54] MEASURING DEVICE FOR ASCERTAINING PIPE DIAMETER AND DEPTH LOCATION

[76] Inventor: Dorsey R. Brumbelow, 12995 Bethany Road, Alpharetta, Ga. 30201

[22] Filed: Sept. 30, 1975

[21] Appl. No.: 618,166

[52] U.S. Cl. .............................. 33/143 M; 33/161; 33/178 R
[51] Int. Cl.² ........................ G01B 5/02; G01B 5/12
[58] Field of Search ......... 33/143 C, 143 D, 143 G, 33/143 K, 143 M, 143 J, 143 R, 147 K, 161, 178 R, 111

[56] References Cited
UNITED STATES PATENTS

| | | | |
|---|---|---|---|
| 752,823 | 2/1904 | Cary | 33/143 M |
| 758,283 | 4/1904 | Shafer | 33/143 M |
| 1,066,273 | 7/1913 | Heintzelman | 33/143 M |
| 3,190,006 | 6/1965 | Madeira | 33/143 M |
| 3,381,382 | 5/1968 | Kemp | 33/111 |
| 3,526,040 | 9/1970 | Young | 33/161 |

FOREIGN PATENTS OR APPLICATIONS

| | | | |
|---|---|---|---|
| 29,784 | 6/1919 | Norway | 33/111 |
| 154,861 | 8/1932 | Switzerland | 33/143 M |
| 276,750 | 10/1951 | Switzerland | 33/143 M |
| 282,708 | 3/1928 | United Kingdom | 33/143 M |

Primary Examiner—Richard E. Aegerter
Assistant Examiner—Richard R. Stearns
Attorney, Agent, or Firm—Bacon & Thomas

[57] ABSTRACT

A measuring device for ascertaining the diameter and depth location of a remotely located pipe or conduit comprising a stationary rod section and a movable rod section slidably carried thereby. The corresponding ends of the rod sections are provided with elongated curved caliper arms having parallel longitudinal axes for facilitating access into the interior of the pipe. The rod sections are provided with measurement scales along their longitudinal surfaces and may further be lengthened by attaching corresponding extension rod sections together.

10 Claims, 13 Drawing Figures

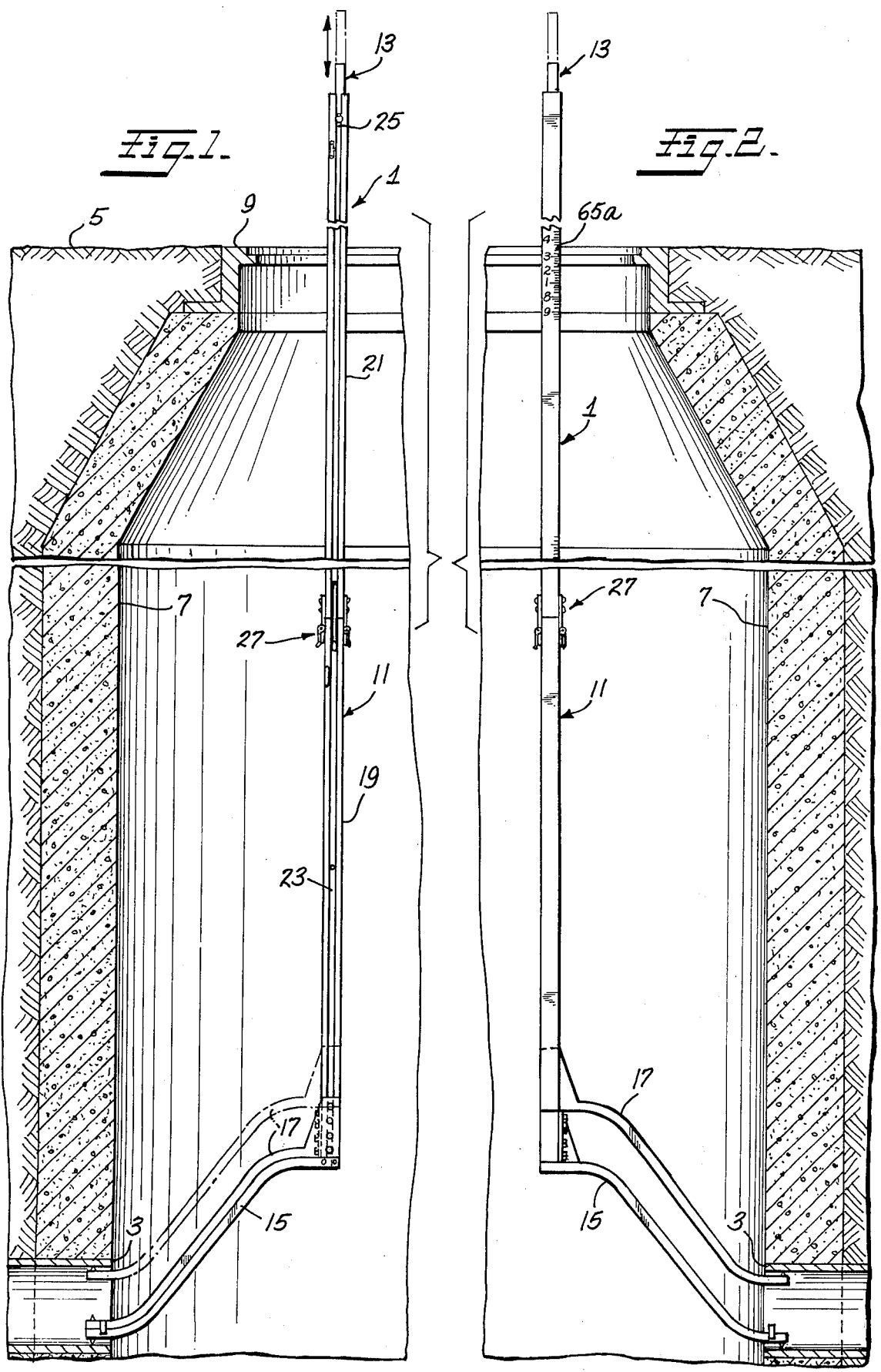

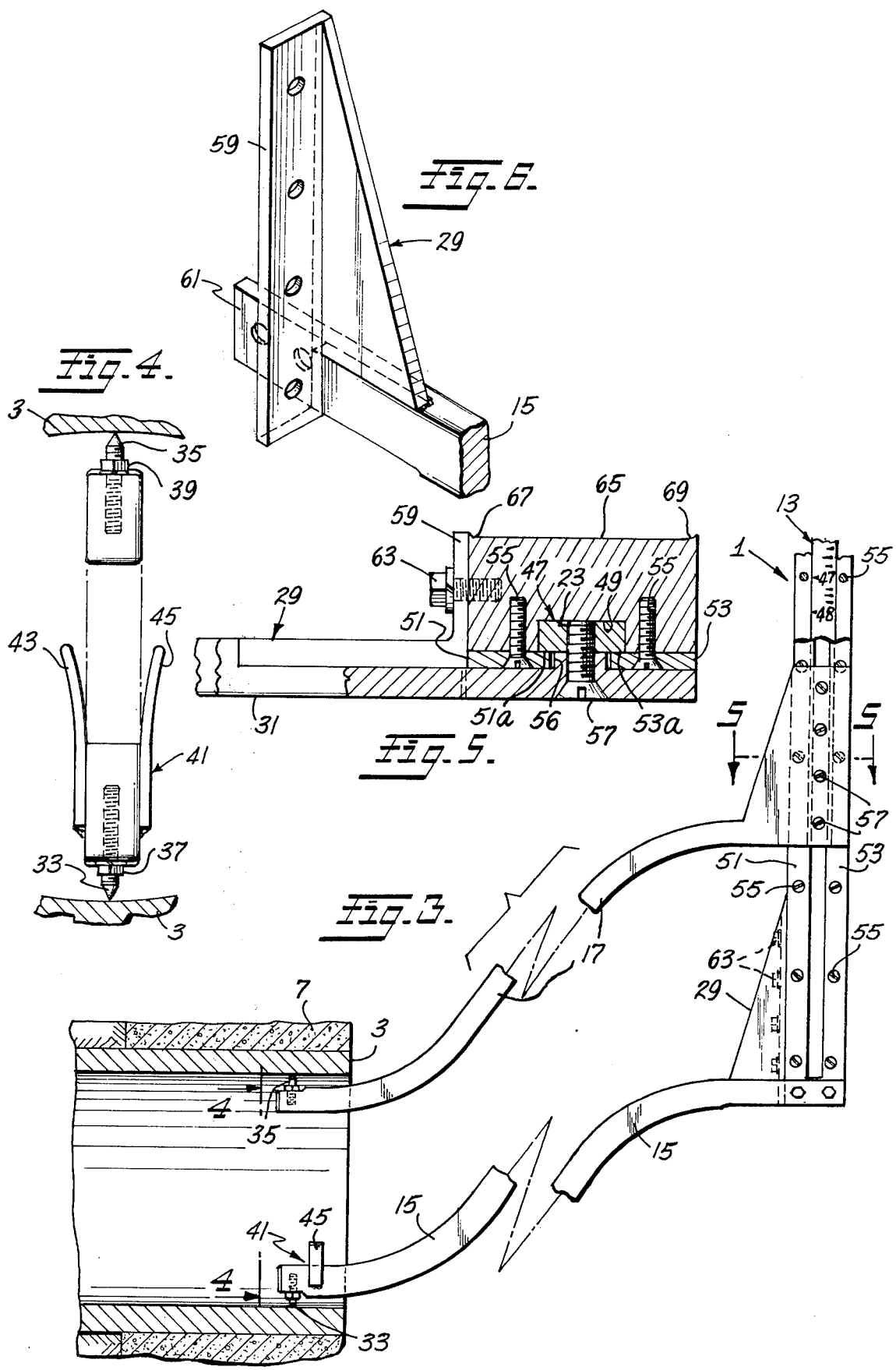

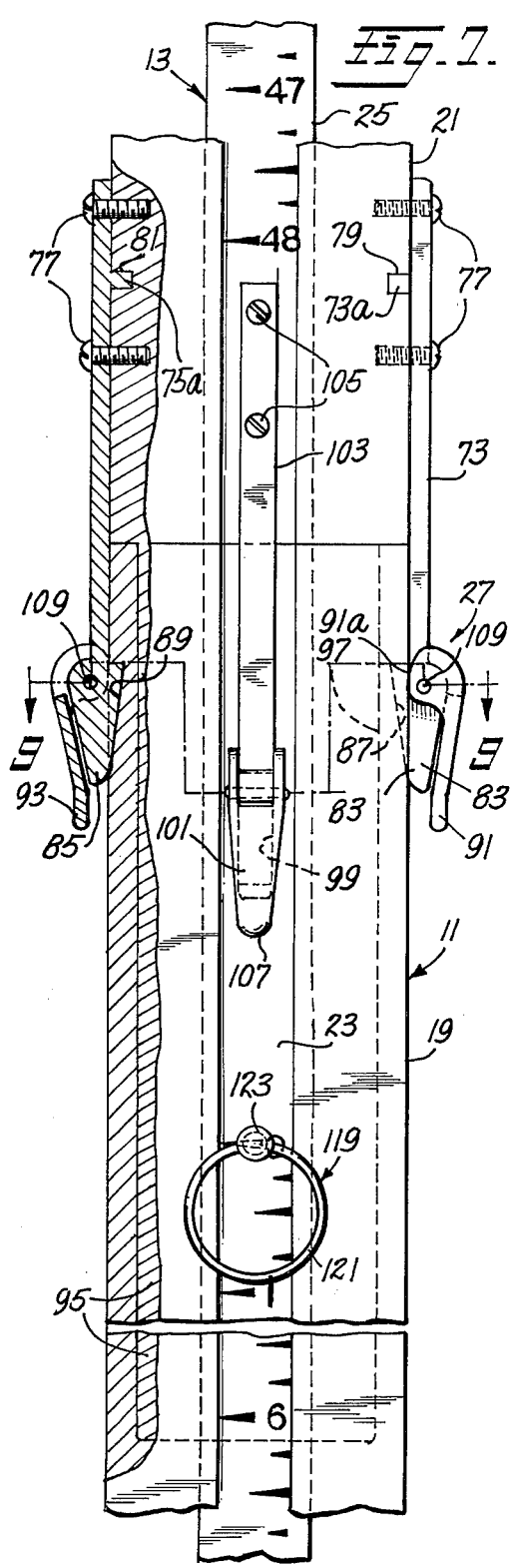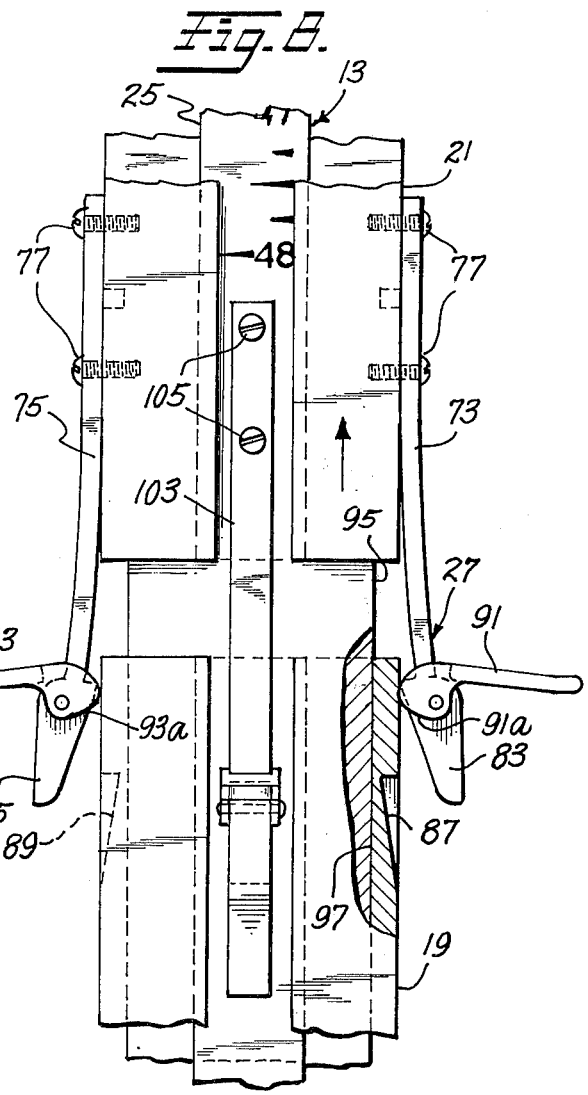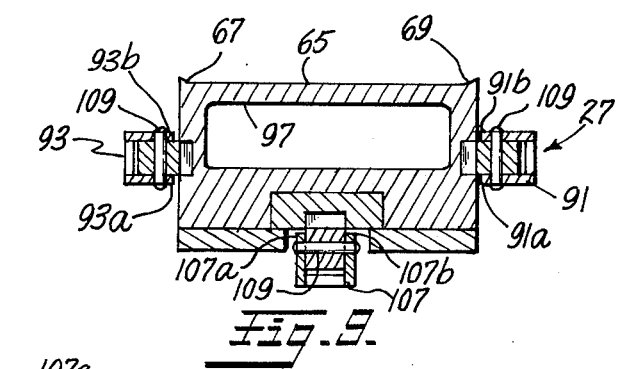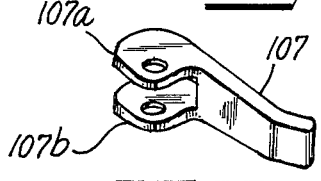

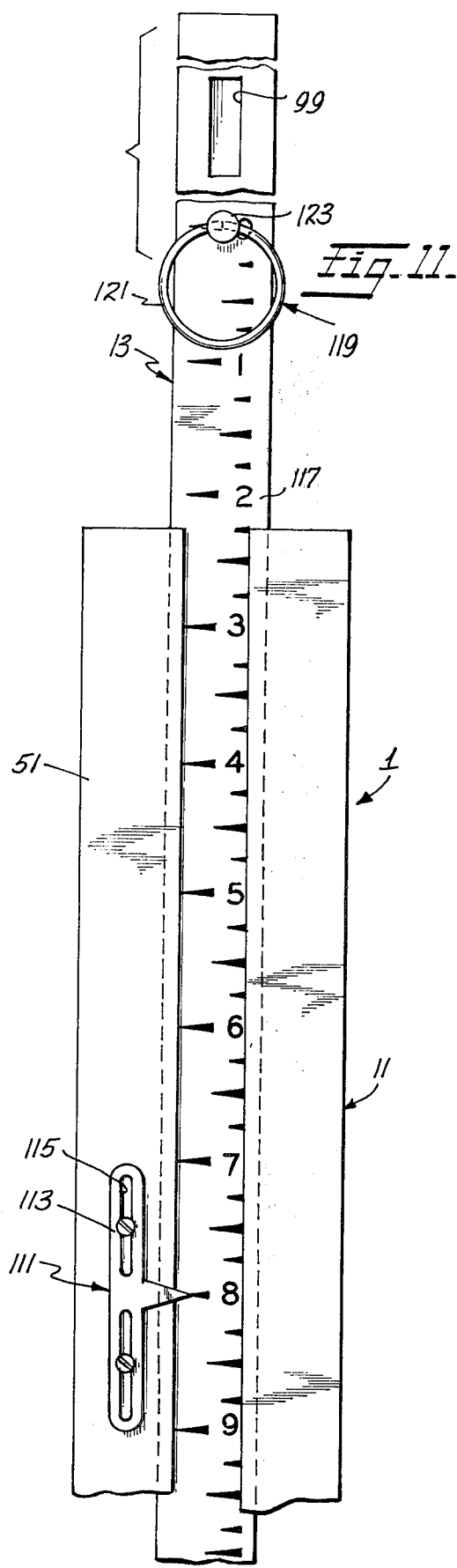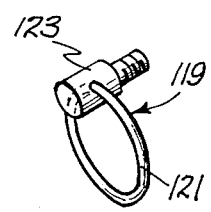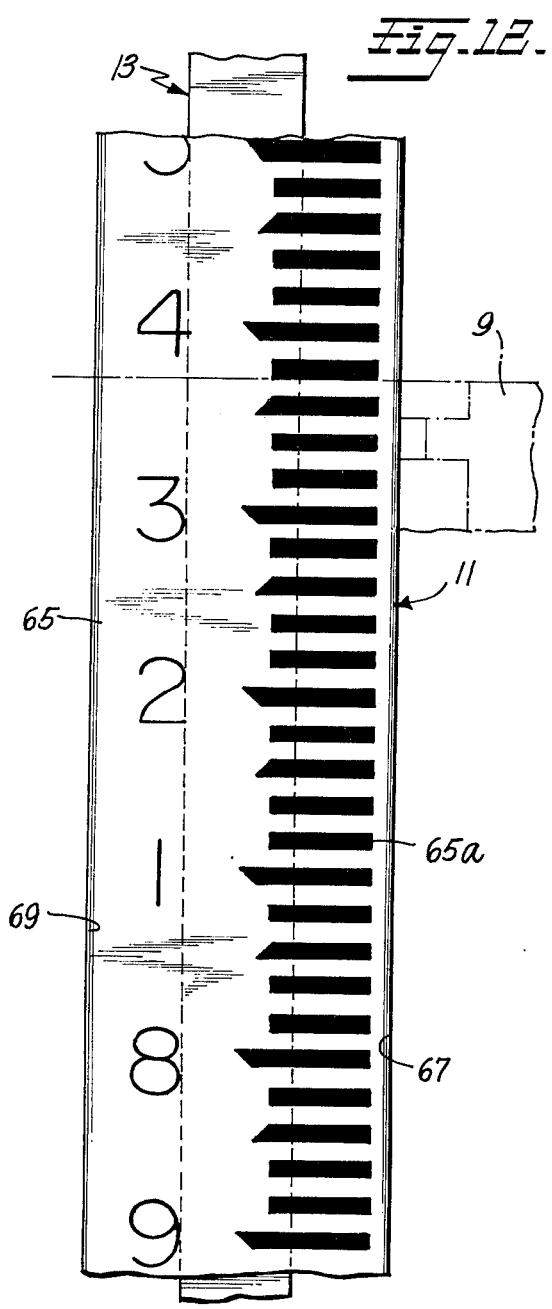

MEASURING DEVICE FOR ASCERTAINING PIPE DIAMETER AND DEPTH LOCATION

BACKGROUND OF THE INVENTION

1/ Field of the Invention

The present invention relates generally to the field of art which includes geometric instruments or similar devices having opposed contacts for ascertaining the measurement of an unknown distance. More particularly, the present invention relates to a measuring device in the form of a geometric instrument for ascertaining the diameter and depth location of a remote pipe or conduit that is not readily accessible for direct measurement.

2. Description of the Prior Art The field of prior art relating to geometric instruments and similar measuring devices for ascertaining distances, diameters and other similar values is very old and replete with many different forms of such devices. One form of these devices includes two slidable members having a pair of opposed contact means secured to corresponding ends of the members. By extending and retracting one member with respect to the other, the contact means are caused to separate or close together until they come in contact with the article or extremities of the distance to be measured. The well known Vernier calipers manifest this basic type of structure. Generally speaking, devices of this nature are normally confined to relatively small, indoor applications and are basically manually held and operated tools. Their usefulness is generally limited to ascertaining the thicknesses and diameters of manufactured or fabricated parts and articles. To a limited extent, there have been prior attempts to adapt the basic opposed contact-type of geometric instrument to larger applications, such as the measurement of interior and external diameters of pipes and similar conduits.

However, in the surveying and engineering fields, there often exists the necessity for ascertaining the precise diameter and exact depth location of a pipe or conduit that is remotely located within an environment that is not readily accessible for direct measurement by means of known prior art measuring devices such as previously described. For example, a sewer or storm pipe may be buried many feet beneath the ground surface and communicate with a concrete casing that is accessible only through a sewer or manhole opening at ground level. In order to secure both the pipe diameter and depth location measurements, the surveyor or engineer must enter the sewer casing and obtain the measurements directly off of the pipe itself. This is obviously a time consuming process which is not without safety considerations for the individual working in such an environment.

SUMMARY OF THE INVENTION

The present invention serves to overcome the difficulties and disadvantages inherent with known prior art devices and systems for ascertaining the diameter and depth location of a remotely located and generally inaccessible pipe or conduit. This is achieved by providing a measuring device in the form of a geometric instrument that includes a stationary rod section and a slidable rod section carried thereby for retraction and extension with respect thereto. A pair of elongated curved caliper arms having parallel longitudinal axes are carried by corresponding ends of the rod sections. The rod sections are provided with measurement scales along their longitudinal surfaces and the overall length of the measuring device may be increased to compensate for varying pipe depths by attaching corresponding extension rod sections together.

It is therefore an object of the present invention to provide for a measuring device that can quickly and safely ascertain the precise diameter of a remotely located or generally inaccessible pipe.

It is another object of the present invention to provide for a measuring device that can quickly and safely ascertain the exact depth location of a remotely located or generally inaccessible pipe from a given point of measurement.

It is yet another object of the present invention to provide for a measuring device in the basic form of a geometric instrument that is simple in both construction and manner of use.

It is yet another object of the present invention to provide for a measuring device that is readily adjustable to compensate for the varying depths of remotely located or generally inaccessible pipes to be measured.

These and other objects of the present invention will be apparent from the following description and appended claims, reference being made to the accompanying drawings forming a part of the specification wherein like reference characters designate corresponding parts in the several views.

BRIEF DESCRIPTION OF THE DRAWINGS

FIG. 1 is a fragmentary elevational view of the measuring device of the present invention, showing the caliper arms in their initial postion and the caliper arm attached to the movable rod section extended in phantom lines for measuring the inside diameter of a buried pipe or conduit;

FIG. 2 is a fragmentary elevational view of the measuring device of FIG. 1, but showing the reverse side indicating the manner in which the depth of the buried pipe or conduit is ascertained from ground level;

FIG. 3 is an enlarged fragmentary elevational view of the lower end of the measuring device of the present invention with the caliper arms secured to the slidable rod section in an extended position;

FIG. 4 is an enlarged fragmentary vertical sectional view, taken along the line 4—4 of FIG. 3;

FIG. 5 is an enlarged fragmentary horizontal sectional view, taken along the line 5—5 of FIG. 3;

FIG. 6 is a fragmentary perspective view of the bracket structure associated with the caliper arm of the stationary rod section;

FIG. 7 is an enlarged fragmentary elevational view, partly in section, showing the latching arrangement of the movable and stationary rod sections;

FIG. 8 is a fragmentary elevational view, partly in section, showing the partially unlatched position of a set of corresponding adjacent movable and stationary rod sections;

FIG. 9 is a horizontal staggered sectional view through the latching arrangement utilized for securing adjacent rod sections together;

FIG. 10 is a perspective view of a cam utilized in the latching arrangement depicted in FIGS. 7 through 9;

FIG. 11 is an enlarged fragmentary elevational view of a portion of the movable rod section;

FIG. 12 is an enlarged fragmentary elevational view of a section of the stationary rod section; and FIG. 13 is a perspective view of a means for sliding the movable rod section.

DETAILED DESCRIPTION OF THE PREFERRED EMBODIMENT

The measuring device 1 of the present invention is depicted in FIGS. 1 and 2 within a possible environment of use. A pipe or conduit 3 is shown buried beneath ground level and communicating with a concrete casing 7 which forms part of a sanitary or storm facility. Access to the interior of casing 7 is achieved through a sewer or manhole opening 9 that is normally kept closed by means of a removable cover (not shown). Because pipe 3 may sometimes be located up to 20 feet below ground surface 5, it is obviously highly desirable that both the inside diameter of pipe 3 and the depth location of the pipe from ground level be ascertained by a surveyor oe engineer positioned on ground level 5. In this manner, the time consuming and somewhat dangerous procedure of entering sewer opening 9 and casing 7 can be eliminated.

As shown in FIGS. 1 and 2, measuring device 1 basically comprises a stationary rod section 11 and a movable rod section 13 slidably carried by stationary rod section 11 for extension and retraction with respect thereto. A pair of elongated curved caliper arms 15 and 17 are carried by corresponding ends of stationary rod section 11 and movable rod section 13, respectively. Arms 15 and 17 are of substantially the same curved configuration, preferably S-shaped, with parallel longitudinal axes. The curved configuration of arms 15 and 17 facilitate their entrance into the interior of pipe 3 when measuring device 1 is manipulated from ground level 5. Because of their parallel longitudinal axes, arms 15 and 17 may be held together in contiguous and conforming relationship when movable rod section 13 is substantially fully retracted within stationary rod section 11, as indicated in FIG. 1.

Stationary rod section 11 includes a stationary base section 19 to which may be attached one or more stationary extension sections 21. Similarly, movable rod section 13 includes a movable base section 23 to which may be attached one or more movable extension sections 25. In this manner, the overall length of measuring device 1 can be increased to compensate for varying pipe depths and environments of use. The attachment of additional lengths of corresponding extension sections 21 and 25 to stationary base section 19 and movable base section 23, and to each other, is effected through a latching arrangement generally indicated at 27, to be hereinafter described in detail.

Referring now to FIGS. 3 and 4, caliper arms 15 and 17 are shown secured at one pair of their corresponding ends to stationary rod section 11 and movable rod section 13 by means of brackets 29 and 31, respectively. The other pair of corresponding ends of arms 15 and 17 are provided with opposed contacts or probes 33 and 35, respectively. Probes 33 and 35 may be in the form of threaded metal rods provided with sharpened points at their exteriors and are secured in place by means of lock nuts 37 and 39. A clamp means 41 may be provided adjacent contact 33 of arm 15, which clamp means 41 may include a pair of spaced spring leaves 43 and 45 for securing arm 17 in conforming and contiguous relationship with arm 15 when movable rod section 13 is substantially fully retracted with respect to stationary rod section 11 as indicated in FIG. 4. In this manner, measuring device 1 may then be stored when not in use and possible damage thereto, particularly with respect to arms 15 and 17, is therefore minimized.

As seen in FIG. 3, brackets 29 and 31 may be formed as integral portions of arms 15 and 17, respectively. Brackets 29 and 31 are generally of similar design and may be attached to the corresponding ends of stationary base section 19 and movable base section 23 in a generally similar manner. As best seen in FIG. 5, stationary base member 19 includes a longitudinal channel 47 which may be formed by means of a longitudinal groove 49 provided within the body of stationary base section 19 and two spaced parallel plates 51 and 53 which overlie the edges of longitudnal groove 49 as indicated at 52a and 53a. Plates 51 and 53 are secured to section 19 by means of screws 55 or other similar fastening means. Movable base section 23 is slidably received within longitudinal groove 49 and held in place by overlying portions 51a and 53a of plates 51 and 53. Bracket 31 is secured directly to the end of movable base section 23, through flange 56 disposed between overlying portions 51a and 53a by means of screws 57 or similar fastening means. Similarly, bracket 29, as shown in FIG. 6, is secured to stationary base member 19 through a vertical flange 59 and a horizontal flange 61 by means of bolts 63 or similar fastening means. As shown in FIG. 3, the lowermost end portions of plates 51 and 53 may abut the upper edge portion of horizontal plate 61.

Referring now to FIG. 5, substantially the entire longitudinal surface of stationary base section 19 opposite longitudinal channel 47, as indicated at 65, is provided with two parallel ridges 67 and 69 in order to prevent contact with surface 65 during use of measuring device 1. In this maner, any measurement scale 65a (as seen in FIG. 2) provided along the length of surface 65 will be prevented from wear and tear by physical contact with the environment in which measuring device 1 is being utilized.

Referring now to FIGS. 7 and 8, latching arrangement 27 for securing additional corresponding stationary and movable rod sections together is depicted in latched and unlatched positions, respectively. As previously indicated, stationary rod section 11 essentially comprises stationary base section 19 provided with caliper arm 15 secured at its lower end and one or more stationary extension sections 21 attached to its upper other end. Similarly, movable rod section 13 comprises movable base section 23 provided with caliper arm 17 at its lower end and one or more movable extension sections 25 secured at its other end. Both stationary extension section 21 and movable extension section 25 are structurally identical with their base section counterparts 19 and 23, respectively, with the exception that the extension sections 21 ad 25 are not provided with caliper arms 15 and 17.

Latching arrangement 27 includes a pair of spring strips 73 and 75 secured to opposite side portions of stationary extension section 21 by means of screws 77 or similar attachment means. Strips 73 and 75 may include inwardly projecting flanges 73a and 75a which are received in corresponding grooves or recesses 79 and 81 formed in the sides of stationary extension section 21. The end portions of strips 73 and 75 are provided with detents 83 and 85 which are received within recesses 87 and 89 formed in the adjacent side portions of stationary base section 19. By virtue of the spring action inherent in strips 73 and 75, detents 83 and 85 are securely biased within recesses 87 nd 89 so that stationary base section 19 and stationary extension section 21 are securely held together in abutting relationship. A pair of levers 91 and 93, having cam surfaces 91a, 91b, 93a and 93b are pivotally secured to detents 83 and 85. By manually pivoting levers 91 and 93 upwardly, as best seen in FIG. 8, cam surfaces 91a, 91b, 93a and 93b are pressed against the sides of stationary base member 19, thereby forcing detents 83 and 85 out of recesses 87 and 89, against the spring action of strips 73 and 75, when it is desired to release and separate stationary extension section 21 from stationary base section 19.

To futther increase the interlock joint strength, locking arrangement 27 may also include the provision of a downwardly depending reduced tongue section 95 on the lower end of stationary extension section 21. Tongue 95 is received within a corresponding shaped groove or recess 97 provided in the adjacent upper end of stationary base section 19. As is therefore evident, each stationary extension section 21 includes a pair of spring strips 73 and 75 with corresponding detents 83 and 85, in addition to a downwardly depending tongue portion 95, at one end thereof and recesses 87 and 89, in addition to tongue recess or groove 97, at its other end. In this manner, any number of stationary extension sections 21 then be utilized to increase the overall working length of stationary base section 19.

Similarly, movable base section 23 can also be lengthened to correspond to the desired overall working length of the stationary rod section 19. As previously indicated, movable rod section 13 includes movable base section 23 and movable extension section 25. The lower end of movable base section 23 corresponding to the lower end of stationary base section 19 is provided with caliper arm 17. The other or upper end of movable base section 23 is provided with a recess 99 formed therein which receives and interlocks with a detent 101 carried at the lower end of a spring strip 103. The other end of spring strip 103 is secured to the adjacent end of movable extension section 25 by means of screws 105 or similar fastening means. A pivotal lever 107 is carried at the end of strip 103 adjacent detent 101 for removing the latter from recess 99 when it is desired to separate movable and extension base sections 25 and 23 from each other. As better seen in FIGS. 9 and 10, lever 107 is provided with a pair of cam surfaces 107a and 107b. Levers 91, 93 and 107 are essentially of the same structural configuration and function. They are all pivotally secured to their respective detents by means of a pin 109 or similar means. As is therefore evident in FIGS. 7 and 8, each movable extension section 25 is provided with a spring strip 103 and associated detent 101 at one end thereof and a corresponding recess 99 at its other end. In this manner, any given number of movable extension sections 25 may be utilized to increase the overall working length of movable base section 23 so that the latter can be correlated to the overall working length of stationary base section 19.

Referring now to FIGS. 11 and 12, measuring device 1 of the present invention is shown in somewhat schematic form to illustrate the manner in which values for diameter and depth of location of pipe 3 are to be ascertained. Movable rod section 11 is provided with an indicator 111 secured thereto by means of screws 113 or similar fastening means. Indicator 111 may be provided with slots 115 through which screws 113 are received in order to permit longitudinal adjustment of indicator 111 with respect to the longitudinal axis of measuring device 1. The exposed surface of movable rod section 13 between plates 51 and 53 is provided with a measurement scale 117 along its longitudinal surface. Scale 117 is viewable through the spacing between plates 51 and 53. A handle means 119 may be provided at the upper end of movable rod section 13 in order to facilitate manual extension and retraction of the latter with respect to stationary rod section 11. As also seen in FIG. 11, movable rod section 13 includes recess 99 at its upper end for attachment with a corresponding detent 101 secured to an adjacent movable extension section 25 should it be desired to increase the overall length of movable rod section 13 in the manner previously described. It is to be understood that movable base section 23 of movable rod section 13 and any movable extension section 25 attached thereto may each be provided with an indicator 111 and an identical measurement scale 117 along its longitudinal surface for viewing through the spacing between plates 51 and 53, which spacing extends substantially the entire distance of the measuring device 1.

FIG. 13 depicts one form of handle means 119 which may be used in conjunction with movable rod section 13 for facilitating sliding of the latter within channel 47 of stationary rod section 11. Handle means 119 may include a ring 121 pivotally secured to a threaded screw or bolt 123 that is attached to the upper end portion of movable rod section 13. However, it is to be understood that any other suitable type of handle means well known in the art can be utilized for effecting the function intended for handle means 119.

BASIC MODE OF OPERATION

The basic manner of utilizng measuring device 1 for ascertaining the diameter and depth of pipe 3 in a remote or generally inaccessible location shall now be described. The surveyor or engineer first determines the general depth location of pipe 3 by visual inspection. If it appears that the working length of stationary base section 19 and movable base section 23 is sufficient, then the measurement procedure can commence. However, if pipe 3 is located quite deep, it will then be necessary to add one or more stationary and movable extension sections 21 and 25 to the working length of stationary and movable base sections 19 and 23, respectively, in order to increase the overall length of measuring device 1. This is achieved by first sliding tongue 95 of stationary extension section into groove 97 of stationary base section 19 until the two sections abut and cause spring-based detents 83 and 85 to lock securely within their corresponding recesses 87 and 89. Similarly, movable extension section 25 is then inserted within channel 47 of stationary base member 19 until spring-biased detent 101 is securely snapped into recess 99 formed in the upper end of movable base section 23. This procedure can be continued until the required number of stationary and movable extension sections 21 and 25 have been joined together. Once this has been accomplished, handle means 119 is grasped and pulled downwardly such that movable rod section 13 is substantially fully retracted within stationary rod section 11. In this position, caliper arm 17 is forced downwardly against corresponding caliper arm 15 and securely held thereagainst in contiguous relationship by clamp 41. Measuring device 1 is then inserted within sewer opening 9 and into casing 7 until probe 33 of caliper arm 15 contacts the lowermost interior wall portion of pipe 3. A first reading is then ascertained from measurement scale 117 on movable rod section 13 by means of indicator 111. Handle 119 is then utilized to extend movable rod section 13 until probe 35 of caliper arm 17 contacts the uppermost inernal wall surface of pipe 3 directly opposite from the wall portion contacted by probe 33. At this stage, a second reading is taken off of measurement scale 117 by indicator 111 such that the difference between the first and second readings will provide a value corresponding to the internal diameter of pipe 3.

As an alternative method of ascertaining the internal diameter of pipe 3, the user of measuring device 1 may first ascertain the distance between the outermost ends of probes 33 and 35 when movable rod section 13 is fully retracted with respect to stationary rod section 11 and caliper arms 15 and 17 are brought into contiguous relationship adjacent each other. This distance may then be indicated by moving indicator 111 on scale 117 through adjustment screws 113. For example, if scale 113 is in inches and the distance is "2 inches," then indicator 111 is set to point at 2. Measuring device 1 may then be inserted in pipe 3 and utilized as described above. However, in this manner, the final reading off scale 117 by present indicator 111 will be a direct reading of the internal diameter of pipe 3. For example, if the final reading off scale 117 is 9, then the internal diameter of pipe 3 is "9 inches."

In ascertaining the depth location of pipe 3 from ground surface 5, the surveyor or engineer using measuring device 1 need only refer to measurement scale 65a provided along the longitudinal back surface 65 of stationary rod section 11 for a direct reading.

It is of course understood that any such suitable scales of measurement well known in the art may be utilized for measurement scales 65a and 117 and, further, compensations may be incorporated in these scales to accommodate for distances between the lowermost ends of stationary rod section 11, movable rod section 13 and the lowermost internal wall section of pipe 3 when probe 33 of caliper arm 15 is resting thereon.

It is to be understood that the embodiment of the invention herewith shown and described is to be taken as a preferred example of the same, and that various changes in shape, size and arrangement of parts may be resorted to without departing from the spirit of the invention or scope of the sub-joined claims.

What is claimed is:

1. A measuring device for ascertaining the diameter and depth of a remotely located pipe, which device comprises:
   a. a stationary rod section provided with a longitudinal channel;
   b. a movable rod section slidably received within the longitudinal channel for extension and retraction with respect to the stationary rod section;
   c. a first elongated arm having a curvilinear configuration carried by an end of the stationary rod section and extending outwardly and downwardly therefrom when the stationary rod section is oriented vertically with the first arm being disposed at the lower end thereof;
   d. a second elongated arm carried by the corresponding end of the movable rod section and having a curvilinear configuration corresponding to the curvilinear configuration of the first elongated arm such that the first and second arms may be disposed together in a substantially parallel contiguous relationship when the movable rod section is substantially fully retracted within the stationary rod section; and
   e. the first and second arms include free ends having a pair of opposed surfaces for contacting corresponding opposed portions of the interior pipe wall when the arms are separated from each other during extension of the movable rod section with respect to the stationary rod section and wherein, during such extension, the free ends of the arms move along an axis that is substantially parallel to the longitudinal axes of the rod sections.

2. The measuring device of claim 1 wherein the first and second arms are substantially of an S-shaped configuration.

3. The measuring device of claim 1 wherein the pair of opposed surfaces include a probe carried on each surface for directly contacting the corresponding opposed portions of the interior pipe wall.

4. The measuring device of claim 1 wherein the longitudinal channel of the stationary rod section includes:
   a. a rectangular-shaped groove, and
   b. a pair of spaced longitudinal plates overlying the longitudinal edges of the groove.

5. The measuring device of claim 1 wherein a clamping means is carried by the first elongated arm for securing the second elongated arm in continuous relationship therewith when the movable rod section is in a substantially fully retracted position with respect to the stationary rod section.

6. The measuring device of claim 1 wherein:
   a. the stationary rod section includes a first measurement scale along its longitudinal surface for directly ascertaining the depth location of the pipe, and
   b. the movable rod section includes a second measurement scale along its longitudinal surface for ascertaining the diameter of the pipe.

7. The measuring device of claim 6 wherein the stationary rod section further includes raised longitudinal edges on either side of the first measurement scale for preventing contact with and wear of same during use.

8. The measuring device of claim 1 wherein:
   a. the stationary rod section includes a first latching means for securing additional corresponding stationary rod sections together, and
   b. the movable rod section includes a second latching means for securing additional corresponding movable rod sections together.

9. The measuring device of claim 8 wherein the first latching means includes:
   a. at least one cam actuated spring latch; and
   b. a tongue and groove interlock.

10. The measuring device of claim 9 wherein the second latching means includes a cam actuated spring latch.

* * * * *